Jan. 23, 1968     MacLELLAN EMSHWILLER     3,365,579
OPTICAL WAVE CORRELATOR WITH ACOUSTICAL MODULATION
Filed April 1, 1965     2 Sheets-Sheet 1
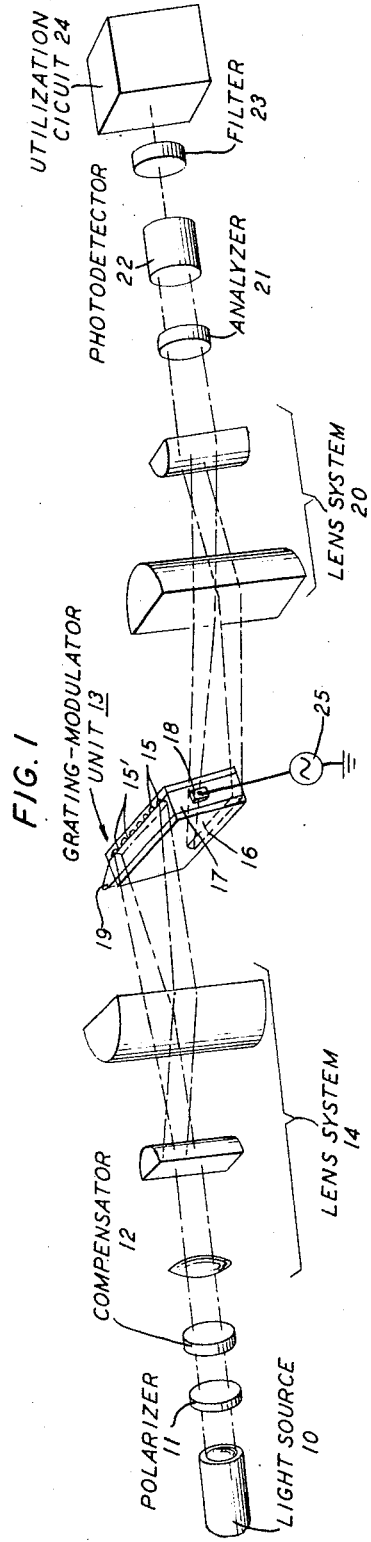
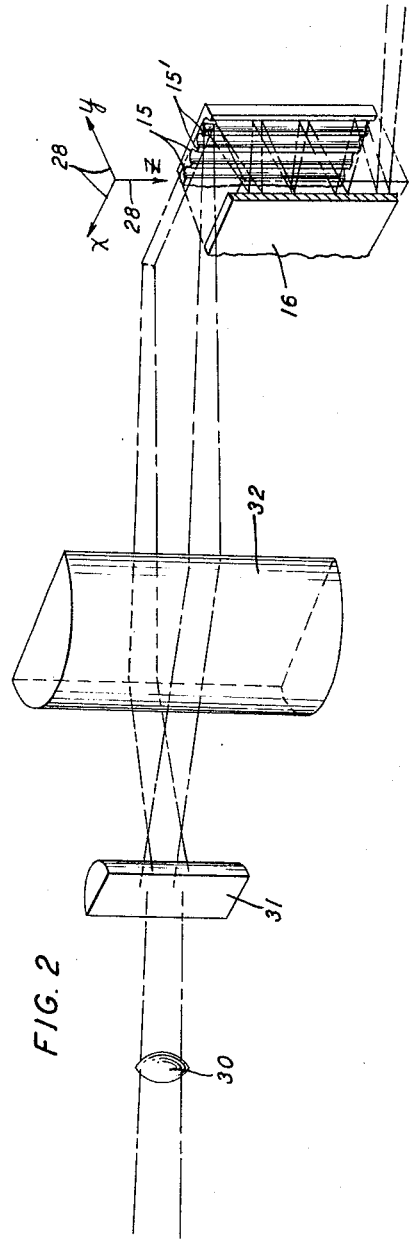
INVENTOR
M. EMSHWILLER
BY
*Sylvan Sherman*
ATTORNEY

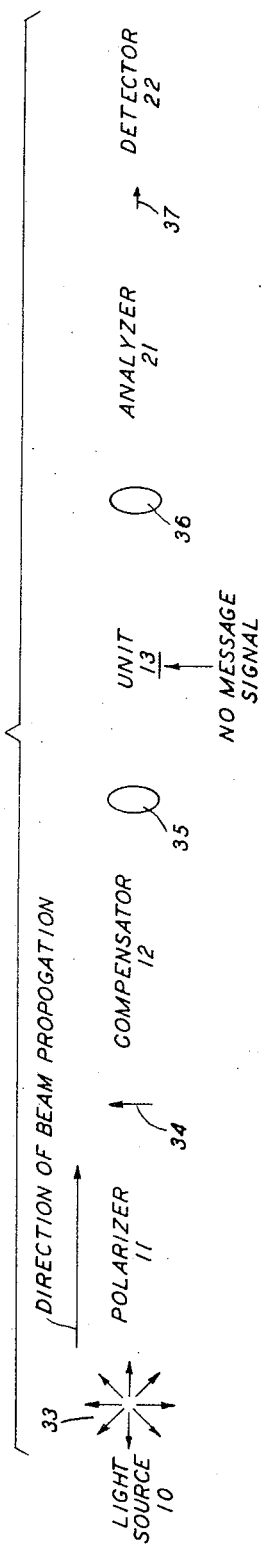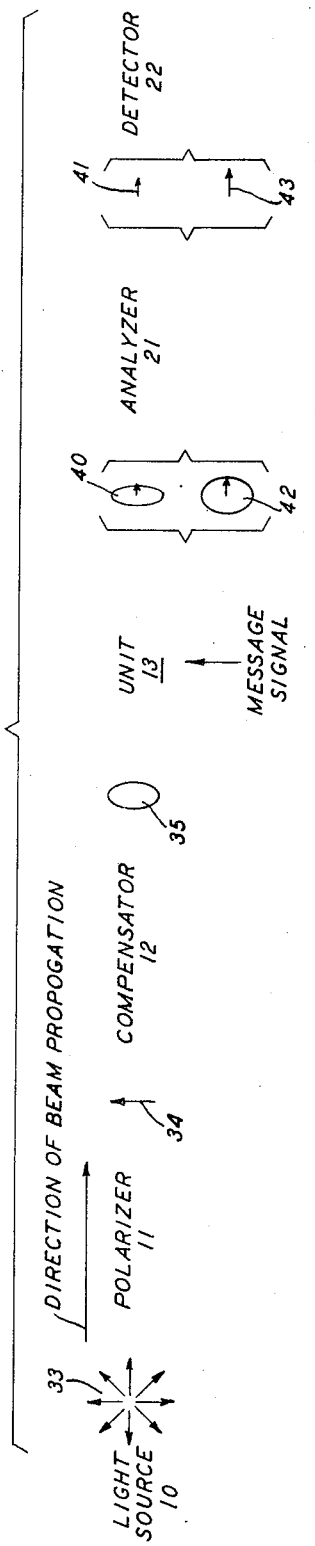

United States Patent Office 3,365,579
Patented Jan. 23, 1968

3,365,579
OPTICAL WAVE CORRELATOR WITH
ACOUSTICAL MODULATION
MacLellan Emshwiller, Orange, N.J., assignor to Bell
Telephone Laboratories, Incorporated, New York, N.Y.,
a corporation of New York
Filed Apr. 1, 1965, Ser. No. 444,865
6 Claims. (Cl. 250—199)

ABSTRACT OF THE DISCLOSURE

This application discloses an efficient optical wave correlator using a light-transparent acoustical medium as a traveling wave grating for modulating the polarization of a collimated optical wave. In particular, a confocal cavity reference grating and acoustic modulator unit is employed to determine the correlation between an applied message wave and a preferred message wave. The unitary structure comprises a confocal arrangement of a planar mirror and a plurality of cylindrical mirrors distributed in accordance with the spatial distribution of the preferred message wave. The acoustical medium is placed between the planar mirror and the cylindrical mirrors. The optical beam is fed into one end of the structure wherein it is reflected back and forth between the planar mirror and the cylindrical mirrors, passing through the acoustic medium after each reflector, until it emerges at the other end. The overall effect is that the unitary confocal structure significantly increases the interaction region between the optical wave and the acoustic wave while, at the same time, minimizing the net internal refraction produced within the acoustical medium.

This invention relates to optical wave correlators.

In applicant's copending application, Ser. No. 182,758, filed Mar. 27, 1962, there is described an optical wave correlator using a light-transparent acoustical medium as a traveling wave grating for phase modulating a collimated optical wave, and a separate, fixed grating, or mask, with which the spatial modulation of the optical wave is compared.

Devices of this general type have been described in the literature. (See, for example, United States Patent No. 3,088,113.)

In general, two serious limitations have prevented the development of efficient optical correlators. The first limitation is the weak photoelastic properties of acoustical materials having a low acoustic loss. This limitation suggests the use of a thick acoustical medium to increase the interaction between the acoustical wave and the optical wave. However, the internal refraction produced within the acoustical medium, places an upper limit upon the thickness of the medium that can be profitably used. This second limitation is restrictive inasmuch as it is advantageous to have as long an interaction distance as possible.

It is, accordingly, an object of the present invention to increase the useful optical interaction distance for an optic wave within an acoustical light modulator.

In accordance with a preferred embodiment of the present invention, the acoustical modulator and the separate, fixed grating utilized in the prior art are replaced by a unitary grating and modulator structure comprising a plurality of cylindrical mirrors associated with a planar mirror in a confocal cavity grating arrangement. The acoustical medium is placed between the cylindrical and planar mirrors. Means are provided for inducing a traveling shear wave within the acoustical medium whose amplitude, and spatial distribution correspond to the message wave to be correlated. The cylindrical mirrors, which are distributed along one side of the acoustic material in accordance with the spatial distribution of a preferred message wave, comprise the fixed grating, or mask, with which the applied message wave is compared.

In accordance with one mode of operation, an elliptically polarized optical wave is applied to the input end of the confocal cavity grating. The optical wave passes through and out of the structure after successive reflections between the cylindrical mirrors and the planar mirror. Each reflection is followed by a passage of the optical wave through the acoustic medium, resulting in a substantial increase in the interaction distances as compared to prior art devices wherein the optical wave passed through the acoustic material only once. However, unlike prior art devices, the net internal refraction produced within the modulator medium is minimized by virtue of the confocal configuration of the grating structure despite the increased interaction distance through the medium.

Upon leaving the output end of the confocal cavity grating, the spatially modulated optical wave is passed through a wave analyzer wherein any change in the ellipticity of the optical wave polarization, produced within the acoustic medium, is detected. The output from the analyzer is, in turn, applied to a photodetector circuit wherein this detected change in ellipticity is sensed as a change in optical intensity.

These and other objects and advantages, the nature of the present invention, and its various features, will appear more fully upon consideration of the various illustrative embodiments now to be described in detail in connection with the accompanying drawings, in which:

FIG. 1 shows an optical correlator in accordance with the present invention;

FIG. 2 shows, for purposes of explanation, a more detailed view of a confocal cavity grating and modulator in accordance with the invention; and FIGS. 3 and 4, included for purposes of explanation, show the polarization of the optical beam at various locations along the correlator under various conditions of operation.

Referring to FIG. 1 of the drawings, there is shown in a mixed block and pictorial diagram, an optical wave correlator in accordance with a preferred embodiment of the invention. As shown in FIG. 1, light, derived from a light source 10, is applied to a light polarizer 11, such as, for example, a Nicol prism. The polarized light produced therein passes through a compensator 12, which can be a thin plate of calcite, wherein it is converted into an elliptically polarized wave. (For a discussion of light polarizers and compensators, see "Fundamentals of Optics," by F. A. Jenkins and H. E. White, McGraw-Hill Book Company, Incorporated, 1957.)

The elliptically polarized light derived from compensator 12 is projected upon the input end of a conical cavity grating and modulator unit 13 by means of a system of lenses 14.

The grating of unit 13 comprises a plurality of cylindrical mirrors 15 of focal length $f$, transversely distributed along one side of the unit to form the reference function mask of the correlator. The regions 15' between adjacent mirrors is made lossy in order to absorb any light incident thereon. Thus, only light incident upon mirrors 15 propagates through the grating-modulator unit 13. A planar mirror 16 is located a distance $f/\mu$ from mirrors 15 to form therewith a confocal cavity grating, where $\mu$ is the effective index of refraction of the material between the mirrors.

Located between mirrors 15 and 16 is a light modulator comprising a transparent, shear wave-supporting acoustical medium 17 such as, for example, fused quartz. A suitable transducer 18 is located on one side of the acoustical medium for launching a shear wave in a direction perpendicular to the axes of the cylindrical mirrors 15, which form the fixed grating. That is, particle motion produced by the shear wave is parallel to the axes of the cylindrical mirrors. The other end of the acoustic medium 17 is terminated by means of an acoustically absorbing material 19 so as to prevent acoustical wave reflections from the far end of the modulator. Signal information for energizer transducer 18 is derived from a message signal source 25.

The light, after having passed through the grating and modulator unit 13 is directed upon analyzer 21 by means of a second system of lenses 20. Analyzer 21, which can be a Nicol prism, is preferably oriented so that its direction of polarization is parallel to the direction of the minor axis of the elliptically polarized light derived from unit 13.

The component of light passed by analyzer 21 is applied to a photodetector 22 which measures the intensity of the light incident thereon and produces an electrical current which is a function of this intensity. The output current from photodetector 22 is supplied to a suitable utilization circuit 24 through a filter 23.

The passage of the optical wave through unit 13 is described in greater detail with reference to FIG. 2, which shows a portion of the confocal cavity grating comprising four of the cylindrical mirrors 15 and a portion of the planar mirror 16. It should be noted that the size of the cylindrical mirrors is greatly exaggerated in FIG. 2 in order to more clearly illustrate the structure. For purposes of explanation, the grating is shown located in an $x$–$y$–$z$ reference coordinate system represented by the three mutually perpendicular vectors 28. Within this reference system, the plane of the grating, formed by cylindrical mirrors 15, is parallel to the $x$–$z$ plane, wherein the $z$ direction is parallel to the axes of the cylindrical mirrors, and the $x$ direction is perpendicular to the cylinder axes.

Similarly, the planar surface of mirror 16 is also parallel to the $x$–$z$ plane, but displaced from the cylindrical mirrors a distance $f/\mu$ in the $y$ direction, where $f$ is the focal length of the cylindrical mirrors, and $\mu$ the index of refraction of the material between the mirrors.

The optical wave energy is advantageously directed upon the grating at an angle of incidence slightly less than perpendicular to the plane of the grating (i.e., in a direction perpendicular to the $x$ direction and slightly less than perpendicular to the $z$ direction) and in the form of a converging ribbon, or wedge, of light, having been formed in that manner by the lens system 14 comprising spherical lens 30 and the two cylindrical lenses 31 and 32. It is apparent, however, that any other suitable lens system can be used for this purpose.

That portion of the beam incident upon each of the cylindrical mirrors is reflected and directed back upon the planar mirror 16. The portion of the beam incident upon the regions 15′ between the cylindrical mirrors, is absorbed. Thus, the incident wedge of light is converted into a plurality of discrete beam components whose spatial distribution along the $x$ direction corresponds to the spatial distribution of the cylindrical mirrors in the $x$ direction.

As described by G. D. Boyd, A. G. Fox and R. Li in United States Patent 3,055,257, all the light introduced into a confocal cavity, which is twice reflected, is substantially indefinitely entrapped within the cavity and is thereafter capable of experiencing a large number of reflections within the confocal cavity. Thus, upon reflection from mirror 16, the light initially reflected by each of the cylindrical mirrors 15, continues to be reflected back and forth between the cylindrical and planar mirrors and to progress down the grating in a plurality of well defined light beams.

It is also apparent that with the acoustic material 17 disposed within the space between mirrors 15 and 16, each passage of the individual light beams between mirrors results in a passage through the acoustic medium. Since it is advantageous that the number of passages through the acoustic medium be large, for maximum interaction between the light and the acoustically excited medium, the incident wedge of light is preferably caused to focus upon a line at the center of the modulator. This arrangement permits the maximum number of passages by the light through the acoustic medium before there is any significant overlapping of the beam.

The "effectiveness" $E$ of the modulator is defined as the ratio of the modulated light power, $P_m$, to the incident light power, $P_i$, divided by the sound power, $P_s$, applied to the acoustic medium. That is $$E = \frac{P_m/P_i}{P_s} \tag{1}$$

It can be shown that $E$ is maximized when $\theta$, the angle of convergence of the incident beam, is given by $$\theta = \frac{N\lambda}{(\tfrac{1}{2}h\Lambda^2 kN)^{1/3}} \tag{2}$$

and the number of reflections $n$ is given by $$n = \left(\frac{2h^2}{\Lambda^2 kN}\right)^{1/3} \tag{3}$$

where $\lambda$ is the wavelength of the light in the acoustic medium;
$\Lambda$ is the wavelength of sound in the acoustic medium;
$h$ is the height of the confocal cavity grating;
$k$ is a constant, less than unity, which relates the focal length $f$ of the cylindrical mirrors to $\Lambda$ and $\lambda$ by $f < k\Lambda^2/\lambda$; and
$N$ is a measure of the spatial coherence of the optical beam. For a diffraction limited beam $N=1$.

Under these conditions, the effectiveness of the modulator is maximized, and can be expressed as $$E_{max} = K \frac{\Lambda}{\lambda^3} \left(\frac{4hk}{\Lambda N^2}\right)^{1/3} \tag{4}$$

where $K$ is a property of the acoustic medium equal to $4\pi\alpha^2\rho v$, wherein $\alpha$ is the piezo-optical constant of the medium, $\rho$ its density, and $v$ the velocity of sound in the medium.

Typically, $N$ is of the order of three or four and $k$ is approximately equal to 0.5.

The action of the modulator upon the polarization of one of the components of the incident light, as it is reflected back and forth within the confocal cavity grating, can be best understood by referring to FIG. 3, which shows the polarization of the optical wave at various locations within the correlator.

In accordance with one mode of operation, the optical wave energy derived from light source 10 (which can be polarized in any direction as indicated by the vectors 33), passes through polarizer 11 and emerges polarized in a first direction, as indicated by arrow 34. The polarized light is then passed through compensator 12, wherein it is converted into an elliptically polarized light beam, as indicated by the ellipse 35.

In the absence of a message signal imposed upon the acoustic medium 17 of the modulator, the elliptically polarized light passes through the confocal cavity grating and modulator unit 13 and experiences no change in ellipticity, as indicated by ellipse 36 which has the same ellipticity as 35. So polarized, the light passes through analyzer 21 which is advantageously oriented to pass only light polarized parallel to the minor axis of ellipse 36. Photodetector 22 responds to the component of light passed by analyzer, indicated by vector 37, and produces a "reference" current output.

If now a message signal is applied to transducer 18, a shear wave is caused to propagate through the acoustic medium 17 in the $x$ direction (i.e., transverse to the direction of propagation of the light signal). The effect of the shear wave is to produce a propagating birefringence in the acoustic medium along two mutually perpendicular axes inclined at 45 degrees to the direction of propagation of the acoustic wave. (For a discussion of shear waves and their effect upon electromagnetic wave propagation see "Ultrasonic Delay Lines," by C. F. Brockelsby, J. S. Palfreeman and R. W. Gibson, published by Iliffe Books Ltd., London, England, pages 157 through 163.)

As a consequence of this induced birefringence, the ellipticity of the elliptically polarized light applied to unit 13 is modulated by the shear waves induced by the message signal. More specifically, the ellipticity of the polarization is increased during one half cycle of the message signal, and decreased during the other half cycle of the message signal, causing corresponding variations in the detector output current. Specifically, the output current increases and decreases with respect to the no-message signal reference current. This is illustrated in FIG. 4, which shows the light, derived from light source 10, converted to elliptically polarized light 35 after passing through polarizer 11 and compensator 12. Due to the presence of a message signal, however, the ellipticity of the polarization of the optical beam is modulated during its passage through the grating-modulator unit 13. During one half cycle of the message signal, the ellipticity is decreased as indicated by ellipse 40. Correspondingly, the output from analyzer 21 contributed by this particular component of light decreases, as indicated by the vector 41 which is smaller than the no-message signal output vector 37. During the next half cycle of the message signal, the ellipticity of the polarization of this component of light is increased as indicated by ellipse 42. Correspondingly, the contribution made by this component in the output from analyzer 21 is also increased, as indicated by the vector 43, which is larger than the no-message signal output vector 37. For maximum modulation of the ellipticity of the applied optical beam, the direction of the major axis of ellipse 35 is directed either parallel or perpendicular to the direction of propagation of the shear wave in the acoustic medium.

The total current produced by photodetector 22 is the running cross correlation between the moving grating produced by the message signal in the acoustic medium 17, and the fixed grating, or mask, defined by the confocal cavity grating of unit 13 as measured by the contribution of all the light components. However, because of the square law response characteristic of a typical photodetector, the output current includes second harmonic components of the correlated message signal as well as the fundamental frequency components of the correlated message signal. For this reason a filter 23 is advantageously included between the correlator and the utilization circuit. The filter can be tuned to pass either the correlated message signal fundamental frequency components or the second harmonic frequency components.

The mode of operation described above is characterized as "linear" operation in that the output current varies about a no-message signal reference current and includes a substantial component of current which is a linear reproduction of the correlation between the message signal and the fixed grating. In a second mode of operation in which the compensator 12 is not used, a detected output signal is derived. In this mode of operation, there is no reference current. The optical wave energy applied to unit 13 is linearly polarized and in the absence of a message signal, leaves unit 13 linearly polarized. Thus, no light passes through analyzer 21 and, hence, no current is produced by photodetector 22.

In the presence of a message signal, however, the linearly polarized light applied to the grating-modulator unit 13 is modulated, and leaves unit 13 elliptically polarized. The component of light polarized parallel to the minor axis of the polarization ellipse is passed by analyzer 21 and an output current is produced by photodetector 22. The output current for this second mode of operation includes primarily detected, or base band frequency components of the correlation function, as well as second harmonic components. Accordingly, filter 23 is advantageously tuned to base band.

It is to be understood that the modes of operation described hereinabove are merely illustrative of two of the many ways in which a confocal cavity grating and modulator unit can be used. Thus, numerous and varied other arrangements can readily be devised in accordance with the teachings of the present invention by those skilled in the art without departing from the spirit and scope of the invention.

What is claimed is:

1. Apparatus for determining the correlation between a message wave and a reference grating comprising:
   a source of elliptically polarized light;
   a confocal cavity reference grating and modulator unit, including;
   a transparent shear wave-supporting medium disposed therein;
   optical means for projecting said elliptically polarized light into said grating and modulator unit;
   means for inducing a shear wave within said medium;
   and means for detecting the variations in the ellipticity of said polarized light produced by said unit.

2. An optical correlator comprising:
   a source of polarized light;
   a confocal cavity reference grating and modulator unit comprising:
      a plurality of cylindrical mirrors of focal length $f$ aligned parallel to each other and spatially distributed to form the reference function mask of said correlator;
      a planar mirror displaced a distance $f/\mu$ from said cylindrical mirrors, where $\mu$ is the index of refraction of the material between said mirrors;
      and a transparent shear wave supporting medium disposed between said cylindrical mirrors and said planar mirrors;
   a transducer for inducing a shear wave in said medium;
   means for projecting said polarized light onto an input end of said grating at a slight angle of incidence whereby said light is reflected back and forth between said cylindrical mirrors and said planar mirror and simultaneously propagates from said input end of said grating to an output end of said grating;
   and means for detecting the variations in the polarization of said light produced in said medium.

3. The correlator according to claim 2 wherein said light is elliptically polarized.

4. The correlator according to claim 2 wherein said light is linearly polarized in a given direction, and wherein said detecting means comprises an analyzer polarized so as to pass light polarized in a direction perpendicular to said given direction.

5. Apparatus for determining the correlation between a message wave and a confocal cavity grating of specified spatial distribution comprising:
   a source of optical wave energy;
   a wave polarizer for polarizing said wave energy in a given direction;
   means for converting the polarization of said wave energy to elliptical polarization;
   a confocal cavity grating and modulator unit comprising;
   a shear wave-supporting acoustical medium and a plurality of cylindrical mirrors of focal length $f$ spatially distributed parallel to each other along one side of said medium in accordance with the spatial distribution of a preferred message signal within said medium;
   a planar mirror disposed along another side of said medium opposite said cylindrical mirrors;
   means for projecting said optical wave energy into one end of said unit at a slight angle of incidence to said mirrors whereby said wave energy is reflected back and forth between said cylindrical and said planar mirrors, successively passing through said acoustical medium and simultaneously propagating from said one end of said unit to an output end of said unit;

a transducer for inducing a shear wave in said medium in a direction transverse to the direction of propagation of said optical wave energy;

and means for detecting changes in the ellipticity of the polarization of the optical wave energy derived from the output end of said unit.

6. A confocal cavity grating and optical wave modulator comprising:

a transparent shear wave-supporting medium;

a plurality of cylindrical mirrors of focal length $f$ aligned parallel to each other and spatially distributed along one side of said medium;

absorptive material disposed between said cylindrical mirrors;

and a planar mirror disposed along another side of said medium opposite said cylindrical mirrors at a distance $f/\mu$ therefrom, where $\mu$ is the effective index of refraction of the material between said mirrors.

References Cited

UNITED STATES PATENTS

| | | |
|---|---|---|
| 2,385,085 | 9/1945 | Labin. |
| 3,087,148 | 4/1963 | Ludewig _____ 350—149 X |
| 3,189,746 | 6/1965 | Slobodin et al. _____ 350—161 X |

OTHER REFERENCES

Johnson et al., Journal Appl. Physics, vol. 33, No. 12, December 1962, pp. 3440–3443.

JOHN W. CALDWELL, *Primary Examiner.*